United States Patent [19]

Border et al.

[11] Patent Number: 5,113,049
[45] Date of Patent: May 12, 1992

[54] FLEXIBLE INDUCTION HEATING COIL

[75] Inventors: John Border, Sandia Park; Rik Salas, Los Lunas; Marc Black, Albuquerque, all of N. Mex.

[73] Assignee: PDA Engineering, Costa Mesa, Calif.

[21] Appl. No.: 655,544

[22] Filed: Feb. 14, 1991

[51] Int. Cl.$^5$ ............................................. H05B 6/36
[52] U.S. Cl. ............................. 219/10.79; 219/10.67; 219/10.75; 219/10.77; 219/534; 219/535; 338/210; 338/214; 338/280; 174/15.7; 174/111; 174/138 R
[58] Field of Search ............... 219/10.79, 10.57, 10.43, 219/10.491, 10.67, 10.75, 10.77, 534, 535, 543, 57, 58, 21, 22, 145, 104, ; 219/233; 174/15.7, 17, 18, 40 CC, 40 TD, 40 R, 126 CP, 111, 138; 338/210, 214, 280; 336/73, 62, 223, 232, 77; 156/49; 373/138

[56] References Cited

U.S. PATENT DOCUMENTS

| | | | |
|---|---|---|---|
| 2,542,702 | 2/1951 | Prow | 219/10.79 |
| 3,162,561 | 12/1964 | Farkas | 219/10.79 |
| 3,260,792 | 7/1966 | Kreisel | 219/10.79 |
| 3,694,628 | 9/1972 | McGwire et al. | 219/550 |
| 3,827,017 | 7/1974 | Keller | 219/10.79 |
| 4,279,255 | 7/1981 | Hoffman | 128/402 |
| 4,313,777 | 2/1982 | Buckley et al. | 156/272 |
| 4,329,569 | 5/1982 | Hjortsberg et al. | 219/535 |
| 4,521,659 | 6/1985 | Buckley et al. | 219/10.77 |
| 4,532,396 | 7/1985 | Burack et al. | 219/10.79 |
| 4,590,346 | 5/1986 | Sugihara et al. | 219/10.43 |
| 4,659,912 | 4/1987 | Derbyshire | 219/535 |
| 4,695,712 | 9/1987 | Busch | 219/535 |
| 4,795,885 | 1/1989 | Driggers et al. | 219/534 |
| 4,810,859 | 3/1989 | Anabtawi et al. | 219/535 |

OTHER PUBLICATIONS

"Bonding and Nondestructive Evaluation of Graphite/-PEEK Composite and Titanium Adherends with Thermoplastic Adhesives", Society of Manufacturing Engineers, 1985.
"Rapid Adhesive Bonding of Thermoplastic Composites and Titanium with Thermoplastic Adhesives", Stein et al., NASA Langley Research Center, vol. 23, No. 7, Jul. 1986.
"High-Tech Materials Alert".

*Primary Examiner*—Bruce A. Reynolds
*Assistant Examiner*—Tu Hoang
*Attorney, Agent, or Firm*—Gordon L. Peterson

[57] ABSTRACT

A flexible induction heating coil comprising an elongated flexible core having proximal and distal ends. The core includes a plurality of core segments flexibly interconnected to make the core more flexible than the individual core segments. An elongated flexible inductor extends along the core.

20 Claims, 2 Drawing Sheets

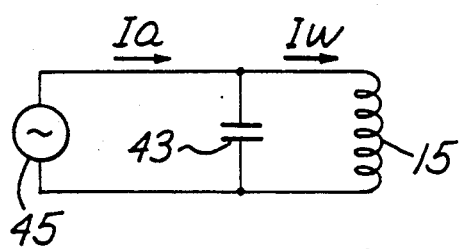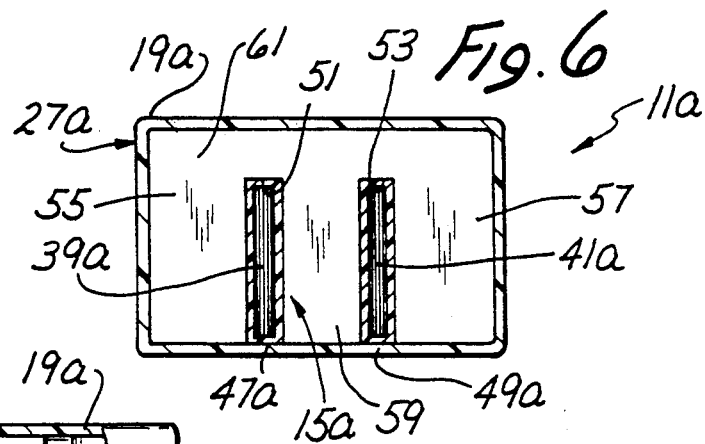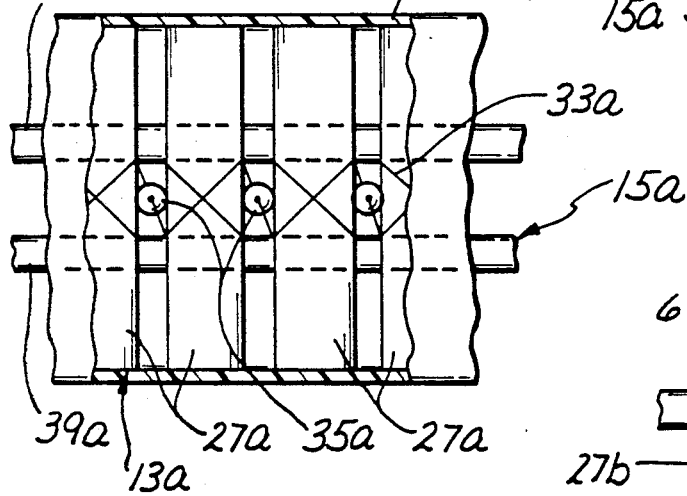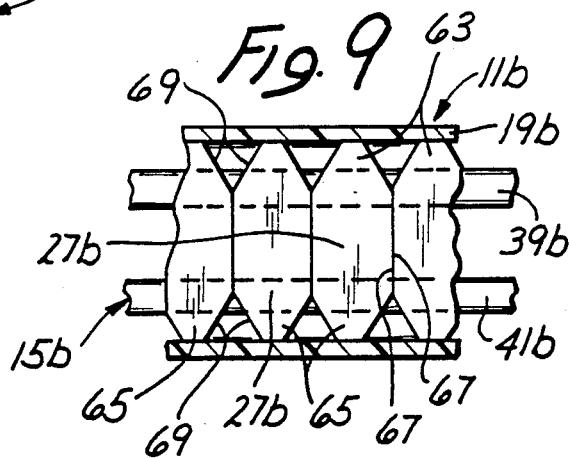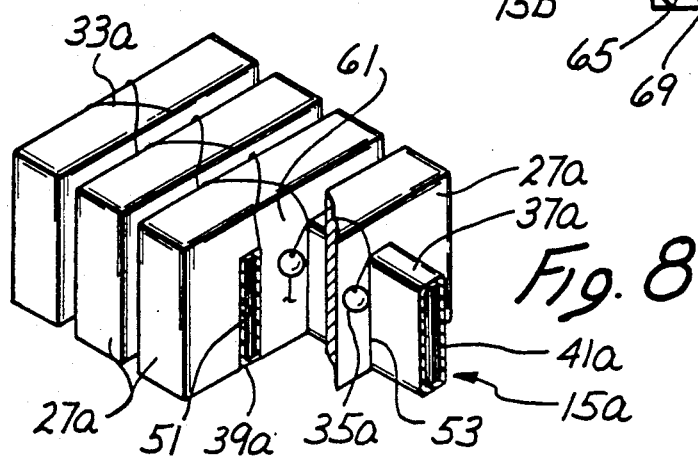

5,113,049

FLEXIBLE INDUCTION HEATING COIL

BACKGROUND OF THE INVENTION

This invention was made with Government support under Contract No. DAAJ02-89-C-0026 and F33657-88-C-0087 awarded by the U.S. Army and Air Force, respectively. The Government has certain rights in the invention.

It is sometimes necessary or desirable to heat curved objects or objects having an irregular configuration. One example of this is the repair of aircraft structures which are commonly curved or have a configuration other than flat. In the aircraft example, heat may be needed, for example, to bond a patch onto an aircraft body using an adhesive which must be raised to an elevated temperature to cure.

Many techniques are available for carrying out the bonding task. For example, ultraviolet curing adhesives can be used, and various different kinds of heaters, such as heat blankets, resistance heating, ultrasonic heaters and a hot fluid may be employed. In addition to these techniques, induction heating can be used. Induction heating can rapidly heat the bonding material and can use various power sources, including small, portable power supplies. This is of particular advantage in aircraft repair in the field such as may be necessary in a battlefield situation.

One known induction heating unit, known as the Torobonder, employs a ferrite core which is capable of focusing a magnetic field to a relatively small area. However, the Torobonder is subject to several disadvantages, including the rigid nature of the coil which makes it unsuited for use on curved or irregularly shaped surfaces.

SUMMARY OF THE INVENTION

This invention provides an induction heating coil which can be used on flat, curved or irregularly shaped surfaces. With this invention, the induction heating coil is flexible so it can conform to surfaces of various different configurations, and it is also capable of concentrating the magnetic field along a heating region to rapidly provide high temperatures along the surface to be heated.

The coil need not be so flexible that it is limp like a string. However, the flexibility should be sufficient to enable the coil to reasonably conform to a curved surface, such as may exist on an aircraft so that its heating function can be efficiently carried out.

This invention may be embodied in an induction heating coil which comprises a core and an inductor which extends along the core. When electrical energy is applied to the inductor, it creates a magnetic field. The core provides a path for the magnetic field and is arranged to concentrate the magnetic field along a heating region of the induction heating coil.

To make the induction heating coil flexible, the core and the inductor must be made flexible. This is a difficult requirement because common high-permeability core materials, such as ferrites, are rigid. Also, at the high frequencies that are to be employed, the losses in iron or powdered iron cores are unacceptable. In fact, for the present invention, preferably some or all of the core segments are constructed of a ferrite and, therefore, are rigid. With this invention, however, flexibility to the core is imparted by using a plurality of core segments flexibly interconnected. This makes the core substantially more flexible than the individual core segments.

The interconnecting means for the core segments can be of virtually any kind or configuration which will provide for the desired flexibility between core segments. For example, the core segments may be interconnected by one or more elongated, flexible strands. Although this is preferred because of its simplicity and low cost, the core segments could also be interconnected by other means, such as a ball and socket joint, a sliding connection that would enable the core segments to slide linearly relative to each other and transversely of the heating coil axis, etc.

The flexible connection may allow the core segments to pivot or otherwise move relative to each other in a way that will impart flexibility to the core so it can conform to a curved surface. If the core segments are to pivot relative to each other, the means which interconnects them may also separate or allow separation of the core segments from each other. This facilitates relative pivotal movement among the core segments.

The inductor preferably has a high current carrying capacity. To provide flexibility and also accommodate the desired high current, it is preferred, although not necessary, to employ a plurality of conductors braided together to form the inductor.

The induction heating coil may also include a sheath surrounding the braided conductors and a sleeve receiving the core and the inductor. Both the sheath and the sleeve are flexible.

The induction heating coil can be provided in various different configurations, including an elongated strap or a relatively broad pad-like member. Additional breadth can be provided by simply enlarging appropriate dimensions of the components of the induction heating coil and/or by weaving a belt-like heating coil back and forth within a broad sleeve. In one preferred construction, the flexible core is elongated, and the inductor has a first length which extends along the core from a location adjacent the proximal end of the core to a second location adjacent the distal end of the core and a second length which extends back toward the first location. In this fashion, the inductor forms a loop that extends out and then back along the core.

The core segments may take various different forms. For example, some or all of the core segments may have a periphery which is at least partially curved, and in one preferred construction, this group of core segments is generally cylindrical. Although these core segments can be arranged in different ways with respect to the inductor, in one preferred arrangement, the core segments are arranged in side-by-side relationship and between the first and second lengths of the inductor with the axes of the core segments lying between the first and second lengths of the inductor. With this arrangement, the core segments are elongated in a direction generally transverse to the direction of elongation of the inductor.

In another example, each of at least a group of the core segments has first and second slots, and portions of the inductor are received in the slots, respectively. This group of core segments, which may be generally E-shaped, are preferably arranged transverse to the direction of elongation of the core and to the direction of elongation of the inductor. To facilitate relative pivotal movement between such core segments, they may, if desired, have tapered end portions.

BRIEF DESCRIPTION OF THE DRAWINGS

FIG. 5 shows an equivalent circuit for the induction heating coil.

FIG. 6 is a sectional view similar to FIG. 2 showing another preferred form of the invention.

FIG. 7 is a top plan view of a region of the second preferred embodiment.

FIG. 8 is an isometric view illustrating one preferred way of interconnecting the core segments of the second embodiment.

FIG. 9 is a view similar to FIG. 7 showing a third embodiment of the invention.

DESCRIPTION OF THE PREFERRED EMBODIMENT

Figure 1:
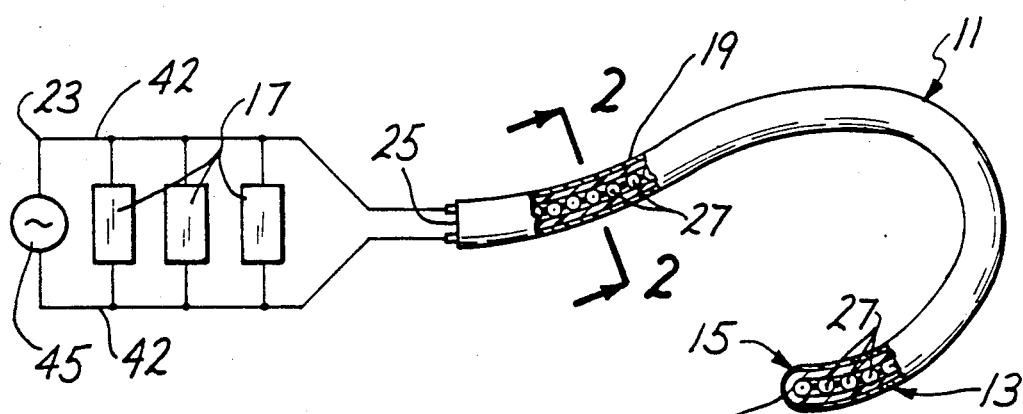
FIG. 1 is a plan view of one form of flexible induction heating coil constructed in accordance with the teachings of this invention.

FIG. 1 shows an induction heating coil 11 which generally comprises a flexible core 13, a flexible inductor 15, capacitors 17 and a flexible sleeve 19 containing the core and the inductor. In this embodiment, the coil 11 and core 13 are elongated. The coil has a distal end 21 and a proximal end 23. The distal end of the core 13 is substantially at the distal end 21 of the coil 11, and the core has a proximal end at a location 25. The capacitors 17, although technically a part of the coil 11, may be located somewhat remotely with respect to the operative heating portion of the heating coil 11.

In this embodiment, the core 13 comprises a plurality of core segments 27 (FIGS. 2-4), each of which is cylindrical and has an axis 29. In this embodiment, each of the core segments 27 is rigid and constructed of ferrite. Although many different configurations are possible, the core segments 27 are tubular, and each of them has a central axial passage 31. Although the core segments 27 are constructed of ferrite, other high-permeability materials can be used, if desired.

Figure 4:
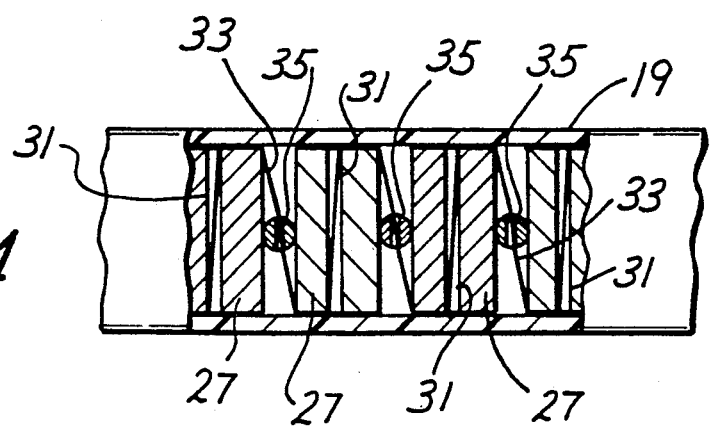
FIG. 4 is an axial, sectional view of a few of the core segments illustrating one manner of joining these segments together.

The core segments 27 are flexibly interconnected to make the core 13 more flexible than the individual rigid core segments 27. Although this can be accomplished in many different ways, in this embodiment, an elongated flexible strand of a tough, flexible, high-temperature resistant material, such as Kevlar, is passed through the passages 31 as shown in FIG. 4 to sew the core segments 27 together. The strand 33 also passes through apertured beads 35, one of which is located between each adjacent pair of the core segments 27.

With this construction, the beads 35 separate the adjacent core segments 27, and the strand 33 flexibly joins the core segments. Consequently, the core 13 is flexible in two planes, i.e., the plane of FIG. 3 and the plane of FIG. 4, in that each of the core segments 27 can pivot about the contiguous beads 35 as permitted by the flexible strand 33. The separation of the core segments 27 by the beads 35 facilitates relative movement and, in particular pivotal movement, among the core segments 27. However, the beads 35 can be replaced with other separating members, such as a rib formed integrally with the core segments. The beads 35, as well as other separating means, can be eliminated, if desired.

Figure 2:
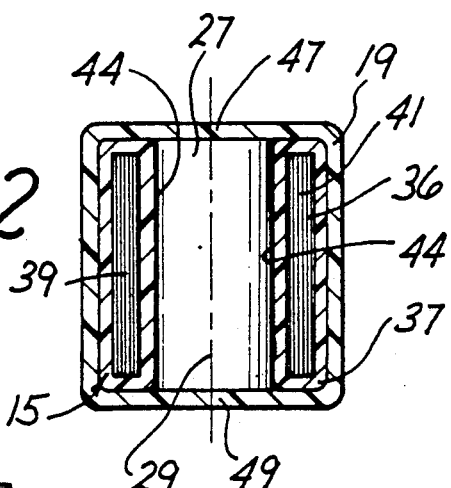
FIG. 2 is an enlarged sectional view taken generally along line 2—2 of FIG. 1.
Figure 3:
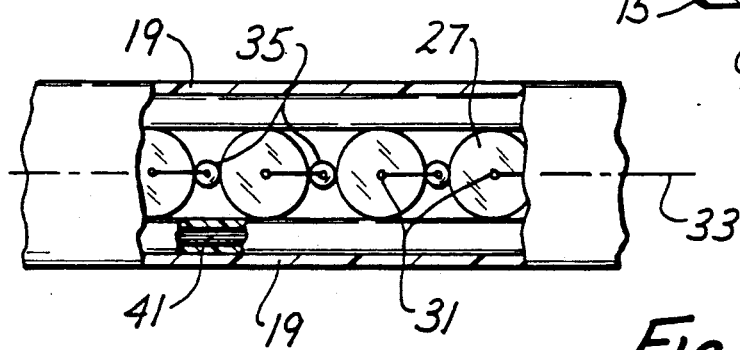
FIG. 3 is an enlarged, fragmentary plan view of a section of the heating coil with a portion of the outer sleeve removed.

The inductor 15 preferably includes a plurality of conductors braided together so it can carry the necessary current while remaining flexible. As shown in FIGS. 2 and 3, the inductor 15 is in the form of a flat braid of bare conductors 36 and includes a flexible sheath 37 of a tough, flexible, high-temperature, electrical insulating material, such as fiberglass or Kevlar, for containing the conductors.

The inductor 15 is elongated and is formed into a loop. Specifically, the flexible inductor has a first length 39 which extends along the core 13 from the location 25 at the proximal end of the core to the distal end 21 of the coil and a second length 41 which extends back toward the location 25. The inductor 15 exits the sleeve 19 at the location 25 where it is coupled to conductors 42. The capacitors 17 are coupled across the conductors 42.

The core segments 27 are arranged in side-by-side relationship between flat opposing faces 44 of the first and second lengths 39 and 41 of the inductor 15. The axes 29 (FIG. 2) of the core segments 27 lie between the lengths 39 and 41 of the inductor 15, and the axes 29 are perpendicular to the direction of elongation of the inductor 15 and the core 13. The core segments 27 are elongated in a direction generally transverse to the direction of elongation of the inductor.

FIG. 5 shows an equivalent circuit for the coil 11 in which the capacitors 17 are represented by a single capacitor 43 coupled across the inductor 15. The resonant frequency of the circuit of FIG. 5 can be expressed as follows: $f = \frac{1}{2}\pi\sqrt{LC}$ where f is the resonant frequency, L is the inductance of the circuit and C is the capacitance of the circuit. If the frequency of the current applied by a power source 45 is the same as the resonant frequency f, the working current $I_w$ which circulates in the resonant circuit and through the inductor 15 is much greater than the applied circuit $I_a$ applied by the power source 45. Because a high current $I_w$ is required to produce a strong magnetic field, use of the resonant circuit of FIG. 5 is preferred. Also, by using the resonant circuit, the size of the power cable leading from the power source 45 to the coil 11 can be reduced. For example, with the circuit of FIG. 5, an applied current $I_a$ of approximately 20 amps can provide a working current $I_w$ of greater than 300 amps. For a 30-inch long coil 11, the power source 45 may be, for example, a 2.5KW generator operating at 120 KHz.

When the coil 11 is energized, the inductor 15 creates a strong magnetic field, and the core provides a path for the magnetic field and concentrates the magnetic field along elongated heating regions 47 and 49 which are intermediate the lengths 39 and 41 of the inductor 15 and closely adjacent the opposite ends of the core segments 27. The heating regions 47 and 49 extend along the full length of the core 13 from the distal end 21 proximally to the location 25. Accordingly, by placing either or both of the heating regions 47 and 49 in contact with the surface to be heated, rapid heating of such surface is brought about. Moreover, because the coil 11 is flexible, it can conform to curved or irregular surfaces whether the curvature exists in either or both of the planes of FIGS. 3 and 4.

FIGS. 6–8 show a coil 11a which is identical to the coil 11 in all respects not shown or described herein. Portions of the coil 11a corresponding to portions of the coil 11 are designated by corresponding reference numerals followed by the letter "a."

Functionally, a primary difference between the coils 11 and 11a is that the latter more efficiently focuses the magnetic field so that lower power is required to achieve the same heating effect. However, the coil 11 is more flexible than the coil 11a. Also, with the coil 11a the heating regions 47a and 49a are on the same side of the coil.

The primary structural difference between the coils 11 and 11a is that the latter employs core segments 27a, each of which has slots 51 and 53 for receiving portions of the lengths 39a and 41a of the inductor 15a. More specifically, each of the core segments is generally in the shape of an "E" and includes outer flanges 55 and 57, a central flange 59 and a web 61 interconnecting the three flanges. The core segments 27a, like the core segments 27, can be flexibly interconnected in a number of different ways. For example, the lengths 39a and 41a of the inductor 15a can be received with a friction fit into the slots 51 and 53 so as to interconnect the core segments 27a. However, in this embodiment, the core segments 27a are interconnected by the flexible strand 33a in any suitable manner, such as the manner shown in FIG. 8 in which the strand is passed through both slots 51 and 53 and around the web 61. The strand 33a extends through the beads 35a in the manner described in connection with FIG. 4 so that the beads 35a can space the adjacent core segments 27a.

The coil 11a is flexible in planes corresponding to planes of FIGS. 3 and 4. However, because of the orientation of the core segments and the length of the core segments 27a transverse to the direction of elongation of the coil 11a and the inductor 15a, less flexibility is provided in the plane of FIG. 7 than in the corresponding plane (FIG. 3) for the core segments 27.

In use, the application of electrical energy to the inductor 15a provides elongated heating regions 47a and 49a at the open ends of the slots 51 and 53. The core segments 27a provide a lower impedance path for the magnetic field so that the field is concentrated at the open ends of the slots 51 and 53 where the field must jump the gap. The heating regions 47a and 49a are elongated and extend for the full length of the core 13a.

FIG. 9 shows a coil 11b which is identical to the coil 11a in all respects not shown or described herein. Portions of the coil 11b corresponding to portions of the coil 11a are identified by corresponding reference numerals with the letter "a" replaced with the letter "b."

The only difference between the coils 11a and 11b is that the latter eliminates the beads 35a in favor of tapered end portions 63 and 65 on the core segments 27b. More specifically, the core segments 27b have inclined surfaces 69 which generally confront each other and which extend away from each other as they extend outwardly from the faces 67. With the coil 11b, the core segments 27b have confronting faces 67 which are confronting and are in engagement, or substantial engagement. However, the tapered end portions 63 and 65 allow the core segments 27b to pivot in the plane of FIG. 9 relative to each other. The lengths 39b and 41b of the inductor 15b have sufficient elasticity and/or are received in the slots of the core segments 27b sufficiently loosely to allow this pivoting movement to occur. The core segments 27b may be sewed together in the same manner as the core segments 27a.

Although exemplary embodiments of the invention have been shown and described, many changes, modifications and substitutions may be made by one having ordinary skill in the art without necessarily departing from the spirit and scope of this invention.

We claim:

1. A flexible induction heating coil comprising:
   a core;
   a flexible inductor extending along the core for use in creating a magnetic field, said core providing a path for the magnetic field and concentrating the magnetic field along a heating region of the induction heating coil; and
   said core including a plurality of core segments of permeable material and means for interconnecting the core segments to allow the core segments to move relative to each other whereby the core is flexible so that the configuration of the heating region can be changed.

2. A coil as defined in claim 1 wherein the inductor is elongated and is formed into a loop so that it extends outwardly along one region of the core and then back along another region of the core.

3. A coil as defined in claim 1 wherein the inductor includes a plurality of conductors braided together.

4. A coil as defined in claim 3 wherein the inductor includes a plurality of conductors and a flexible sheath containing the conductors.

5. A coil as defined in claim 1 wherein at least some of the core segments are rigid.

6. A coil as defined in claim 1 wherein the interconnecting means includes an elongated flexible strand for interconnecting at least some of the core segments.

7. A coil as defined in claim 1 wherein the inductor is elongated, the core segments of at least a group of the core segments are elongated in a direction generally transverse to the direction of elongation of the inductor and each of said core segments of said group of core segments has a periphery which is at least partially curved.

8. A coil as defined in claim 1 wherein at least some of said core segments are generally cylindrical.

9. A coil as defined in claim 1 wherein each of the core segments of a group of the core segments has first and second slots and portions of the inductor are received in said slots, respectively.

10. A coil as defined in claim 1 wherein the interconnecting means includes means for separating the core segments from each other.

11. A coil as defined in claim 1 including a flexible sleeve receiving the core and the inductor.

12. A flexible induction heating coil comprising:
   an elongated flexible core having proximal and distal ends, said core including a plurality of core segments flexibly interconnected to make the core more flexible than an individual core segment; and
   an elongated flexible inductor having a first length which extends along the core from a first location adjacent the proximal end of the core to a second location adjacent the distal end of the core and a second length which extends back toward the first location, said inductor being usable to create a magnetic field, said core providing a path for the magnetic field and concentrating the magnetic field along an elongated heating region whereby the flexibility of the core and the inductor enable configuration of the elongated heating region to be changed.

13. A coil as defined in claim 12 wherein the inductor includes a plurality of conductors and a flexible sheath containing the conductors.

14. A coil as defined in claim 12 wherein at least some of the core segments are rigid.

15. A coil as defined in claim 12 wherein at least some of the core segments include ferrite.

16. A coil as defined in claim 12 wherein the core segments of at least a group of the core segments are cylindrical and arranged in side-by-side relationship between the first and second lengths of the inductor with the axes of said group of core segments lying between the first and second lengths of the inductor.

17. A coil as defined in claim 16 including an elongated flexible strand for interconnecting at least some of the core segments, at least some of the core segments are rigid, the inductor includes a plurality of conductors and a flexible sheath containing the conductors.

18. A coil as defined in claim 12 wherein each of the core segments of a group of the core segments has first and second slots and portions of the inductor are received in said slots, respectively.

19. A coil as defined in claim 18 including an elongated flexible strand for interconnecting at least some of the core segments, at least some of the core segments are rigid, the inductor includes a plurality of conductors and a flexible sheath containing the conductors.

20. A coil as defined in claim 18 wherein the core segments of said group of core segments are arranged generally transverse to the direction of elongation of the core and have tapered end portions to facilitate relative pivotal movement of such core segments.

* * * * *